United States Patent
Yang (10) Patent No.: US 12,111,954 B2
(45) Date of Patent: Oct. 8, 2024

(54) METHOD AND SYSTEM OF PROVIDING PERSONAL INFORMATION BASED ON BLOCKCHAIN

(71) Applicant: INJE UNIVERSITY INDUSTRY-ACADEMIC COOPERATION FOUNDATION, Gimhae-Si (KR)

(72) Inventor: Jinhong Yang, Daejeon (KR)

(73) Assignee: INJE UNIVERSITY INDUSTRY-ACADEMIC COOPERATION FOUNDATION, Gimhae-Si (KR)

( * ) Notice: Subject to any disclaimer, the term of this patent is extended or adjusted under 35 U.S.C. 154(b) by 411 days.

(21) Appl. No.: 17/408,277

(22) Filed: Aug. 20, 2021

(65) Prior Publication Data

US 2021/0383024 A1    Dec. 9, 2021

Related U.S. Application Data

(63) Continuation of application No. PCT/KR2019/008233, filed on Jul. 4, 2019.

(30) Foreign Application Priority Data

Apr. 1, 2019    (KR) .................. 10-2019-0037652

(51) Int. Cl.
*G06F 21/62*    (2013.01)
*G06F 3/0482*    (2013.01)
(Continued)

(52) U.S. Cl.
CPC ........ *G06F 21/6263* (2013.01); *G06F 3/0482* (2013.01); *G06F 21/602* (2013.01); *H04L 63/102* (2013.01); *H04L 67/53* (2022.05)

(58) Field of Classification Search
CPC .. G06F 21/6263; G06F 3/0482; G06F 21/602; G06F 21/6245; H04L 63/102;
(Continued)

(56) References Cited

U.S. PATENT DOCUMENTS 7,877,460 B1 *    1/2011    Brouwer ................. G06Q 10/10
                                                              709/205
9,294,452 B1 *    3/2016    Jakobsson ............... H04L 63/08
(Continued)

FOREIGN PATENT DOCUMENTS

| JP | 2018109994 A * | 7/2018 | ............. G06F 12/00 |
| KR | 10-1590076 B1 | 2/2016 | |

(Continued)

OTHER PUBLICATIONS

Zheng, Xiaochen, et al. "Blockchain-based personal health data sharing system using cloud storage." 2018 IEEE 20th international conference on e-health networking, applications and services (Healthcom). IEEE, 2018. (Year: 2018).*

(Continued)

*Primary Examiner* — Theodore C Parsons
*Assistant Examiner* — Sameera Wickramasuriya
(74) *Attorney, Agent, or Firm* — Studebaker & Brackett PC (57) ABSTRACT

Provided are a method and system of providing personal information on the basis of a blockchain. The blockchain-based personal information providing method includes making a data privacy-related contract with a user and providing user data, which corresponds to personal information of the user according to the data privacy-related contract, to a service for accessing the user data using a contract with the service.

13 Claims, 8 Drawing Sheets

(51) Int. Cl.
*G06F 21/60* (2013.01)
*H04L 9/40* (2022.01)
*H04L 67/53* (2022.01)

(58) Field of Classification Search
CPC ....... H04L 67/53; H04L 9/50; H04L 2209/42; H04L 9/3239; H04L 63/04; H04L 63/08; H04L 67/1097; H04L 67/306; H04L 67/51; H04L 63/10; H04W 12/02; G06Q 50/10
See application file for complete search history.

(56) References Cited

U.S. PATENT DOCUMENTS

| 10,298,395 | B1* | 5/2019 | Schiatti | H04L 9/3218 |
| 2016/0147975 | A1* | 5/2016 | Han | G16H 50/70 |
| | | | | 705/2 |
| 2018/0117446 | A1* | 5/2018 | Tran | G06F 1/163 |
| 2018/0270367 | A1* | 9/2018 | Suzuki | H04N 1/001 |
| 2019/0045010 | A1* | 2/2019 | Ha | G06F 3/0664 |
| 2020/0057487 | A1* | 2/2020 | Sicconi | G06T 7/254 |
| 2020/0268260 | A1* | 8/2020 | Tran | A61B 5/1118 |

FOREIGN PATENT DOCUMENTS

| KR | 10-1868029 B1 | 6/2018 |
| KR | 10-1916302 B1 | 11/2018 |
| WO | 2017/090041 A1 | 6/2017 |

OTHER PUBLICATIONS

Chakravorty, Antorweep, and Chunming Rong. "Ushare: user controlled social media based on blockchain." Proceedings of the 11th international conference on ubiquitous information management and communication. 2017. (Year: 2017).*
International Search Report issued in PCT/KR2019/008233; mailed Feb. 10, 2020.

* cited by examiner

METHOD AND SYSTEM OF PROVIDING PERSONAL INFORMATION BASED ON BLOCKCHAIN

CROSS-REFERENCE TO RELATED APPLICATION

This application is a continuation of International Patent Application No. PCT/KR2019/008233, filed on Jul. 4, 2019, which is based upon and claims priority to and the benefit of Korean Patent Application No. 10-2019-0037652, filed on Apr. 1, 2019, the disclosure of which is incorporated herein by reference in its entirety.

BACKGROUND

1. Field of the Invention

The present invention relates to a technology for providing personal information.

2. Discussion of Related Art

To provide a user-centered service, websites collect a considerable amount of personally identifiable information (PII) (e.g., age, race, social security number, residential address, and driver's license). Currently, more than 50 million people use several social networking services (SNSs) and provide massive amounts of PII to the SNSs. All these SNSs, other websites, and mobile applications allow login to or registration for a premium service. Sometimes, PII is used to authenticate the identification of a customer in an organization. Most of the SNSs and applications are free, and thus many studies have found that such organizations infringe on PII. Actually, these organizations store, distribute, and analyze important PII to generate a business model through user profiling. Large technology companies use a third-party service of companies which provide the PII of customers. Ultimately, these auxiliary organizations collect, analyze, and distribute data from several organizations. As a result, users do not know a final destination of the data. We all enjoy the benefits of a data-driven industry, but illegal use of PII is a dark side of the data-driven industry. The Guardian said in April 2018 that Facebook, the largest SNS website, infringed on 87 million pieces of personal data and users' PII. Persistent data breaches occur in the era of big data mentioned in several studies. According to Armerding, data breaches occurred at different organizations, such as Yahoo (3 billion), eBay (14.5 billion), Adobe (38 million people), JP Morgan (76 million people), the U.S Human Resource Administration (22 million people), and the like. According to the breach level index (BLI) of Gemalto, data of 4 million people was leaked every year, and 74% thereof was used for identity theft. Forbes magazine has identified data as the new currency of trade marketing. It has been reported that about 200 million dollars is invested to exchange PII. Companies exchange customers' data to make a profit. Inter-firm communication will widely apply, and accordingly, it is necessary to consider PII management and tracking.

Blockchain technology has drawn many researchers' attention and is being used beyond the field of cryptocurrency. A blockchain includes a series of blocks which may accommodate any data like an existing open ledger. Also, the blocks are connected and protected together using encryption. Some researchers use a blockchain for PII management. However, the recently enacted General Data Protection Regulation (GDPR) is intended to protect personal information, and thus institutions are required to pay special attention to individual consent and data sharing. It is necessary to obtain consent before personal data is analyzed, and also institutions are responsible for independently withdrawing or deleting the data (also known as the "right to be forgotten"). A blockchain PII storage architecture is based on the "immutability" of data. On the contrary, the GDPR requires that personal information be changeable and removable at a request of the data owner.

SUMMARY OF THE INVENTION

The present invention is directed to providing a blockchain-based personal information providing method and system for providing user data using a contract with a blockchain controller having an access right.

According to an aspect of the present invention, there is provided a blockchain-based personal information providing method executed in a computer device including at least one processor configured to execute computer-readable instructions included in a memory, the method including making, by the at least one processor, a data privacy-related contract with a user, and providing, by the at least one processor, user data corresponding to personal information of the user according to the data privacy-related contract to a service for accessing the user data using a contract with the service.

The making of the data privacy-related contract with the user may include performing user authentication for data interoperation with an online data storage, which is used by the user to store the user data, and setting an access right range for the online data storage when the user authentication is completed.

The setting of the access right range may include setting an accessible data entry and a monitoring period.

The making of the data privacy-related contract with the user may include receiving information on a data providing range that the user has agreed on upon subscription from a service provider of the online data storage.

The making of the data privacy-related contract with the user may include providing a monitorable data list upon subscription to the service and then setting a data entry selected through the data list as a monitoring target.

The making of the data privacy-related contract with the user may include contracting with an online data storage, which is used by the user to store the user data, and providing an interface function of interoperating with the online data storage.

The providing of the user data may include providing a function of interoperating with user data generated by a terminal of the user through an agent for monitoring a service usage environment of the user.

The providing of the user data may include, when the user selects one piece of the user data as content to be posted to the service, acquiring access information of the content from an online data storage in which the user data is stored and transmitting the access information to the service, and transmitting the content stored in the online data storage to the service under the contract with the service in response to a request from the service using the access information.

The providing of the user data may further include generating a transaction for a record of use of the user data by the service after the content is transmitted to the service.

According to another aspect of the present invention, there is provided a computer device including at least one processor configured to execute computer-readable instructions included in a memory. The at least one processor includes a controller configured to make a data privacy-related contract with a user and provide user data corresponding to personal information of the user according to the data privacy-related contract to a service for accessing the user data using a contract with the service.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings.

Figure 1:
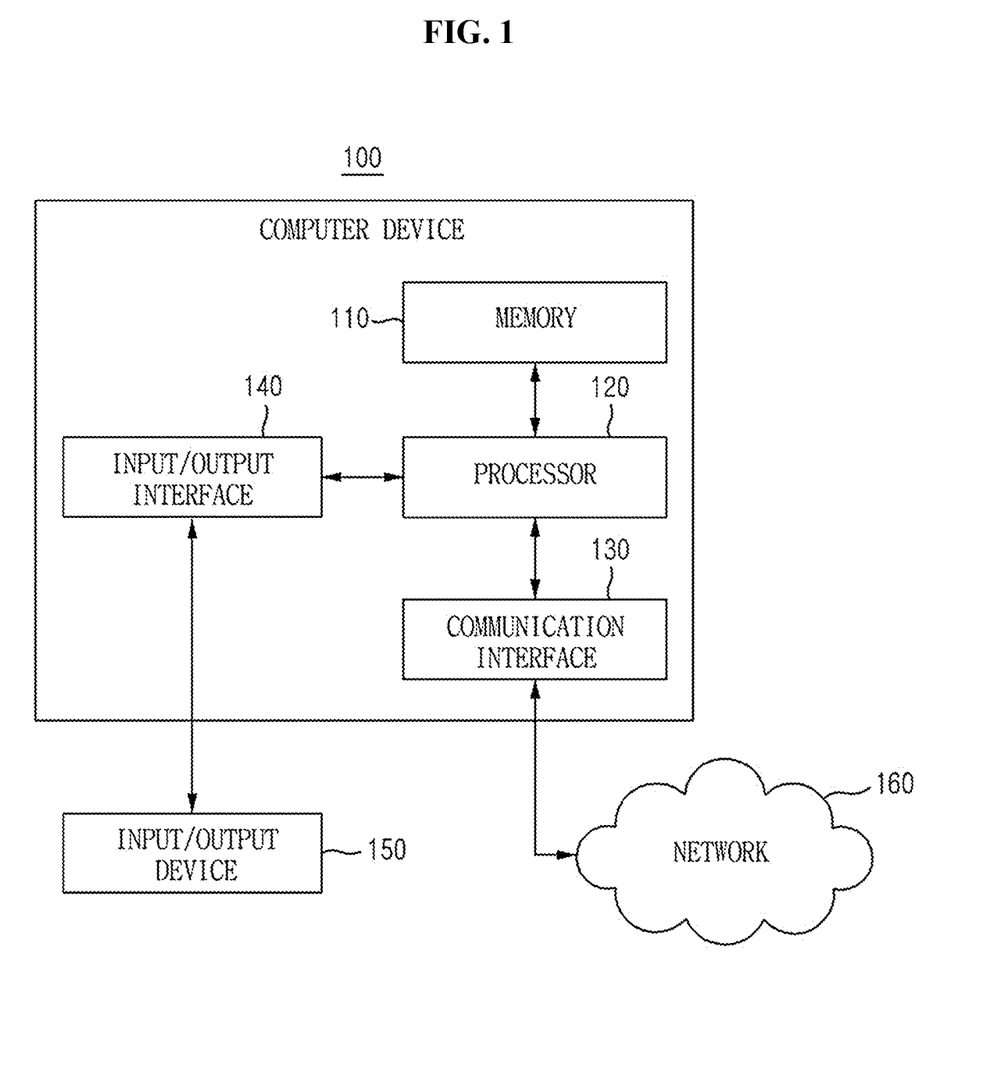
FIG. 1 is a block diagram illustrating an example of an internal configuration of a computer device according to an exemplary embodiment of the present invention.

FIG. 1 is a block diagram illustrating an example of an internal configuration of a computer device according to an exemplary embodiment of the present invention.

For example, a personal information providing system according to exemplary embodiments of the present invention may be implemented through a computer device 100 of FIG. 1. As shown in FIG. 1, the computer device 100 may include a memory 110, a processor 120, a communication interface 130, and an input/output interface 140 as components for performing a personal information providing method to be described below.

The memory 110 is a computer-readable recording medium and may include a random access memory (RAM), a read-only memory (ROM), and a permanent mass storage device such as a disk drive. Here, the ROM and the permanent mass storage device, such as a disk drive, may be included in the computer device 100 as a permanent storage device which is distinct from the memory 110. Also, an operating system (OS) and at least one program code may be stored in the memory 110. These software components may be loaded from a computer-readable recording medium distinct from the memory 110 to the memory 110. Such a computer-readable recording medium may include a floppy drive, a disk, tape, a digital versatile disc (DVD)/compact disc (CD)-ROM drive, a memory card, and the like. According to another exemplary embodiment, the software components may be loaded to the memory 110 through the communication interface 130 rather than a computer-readable recording medium. For example, the software components may be loaded to the memory 110 of the computer device 100 on the basis of a computer program installed by files received through a network 160.

The processor 120 may be configured to process an instruction of the computer program by performing basic arithmetic, logical, and input/output computations. An instruction may be provided to the processor 120 by the memory 110 or the communication interface 130. For example, the processor 120 may be configured to execute a received instruction according to a program code stored in a storage device such as the memory 110.

The communication interface 130 may provide a function for the computer device 100 to communicate with other devices (e.g., the storage devices described above) through the network 160. For example, a request, an instruction, data, a file, or the like which is generated by the processor 120 of the computer device 100 according to a program code stored in a storage device, such as the memory 110, may be transmitted to other devices through the network 160 according to control of the communication interface 130. In reverse, a request, an instruction, data, a file, or the like from another device may be received by the computer device 100 through the network 160 and then the communication interface 130 of the computer device 100. The request, instruction, data, or the like received through the communication interface 130 may be transmitted to the processor 120 or the memory 110, and the file or the like may be stored in a storage medium (the above-described permanent storage device) that the computer device 100 may further include.

The input/output interface 140 may be a device for interfacing with the input/output device 150. For example, the input device may include a device, such as a microphone, a keyboard, or a mouse, and the output device may include a device, such as a display or a speaker. As another example, the input/output interface 140 may be a device for interfacing with a device, such as a touchscreen, in which functions for input and output are integrated. The input/output device 150 may be integrated into the computer device 100.

Also, according to other exemplary embodiments, the computer device 100 may include fewer or more components than shown in FIG. 1. However, it is unnecessary to clearly show most conventional components. For example, the computer device 100 may be implemented to include at least some of the aforementioned examples of the input/output device 150 or may further include other components such as a transceiver and a database.

A personal information providing system implemented as the computer device 100 will be referred to as a blockchain controller for privacy (BCP).

Figure 2:
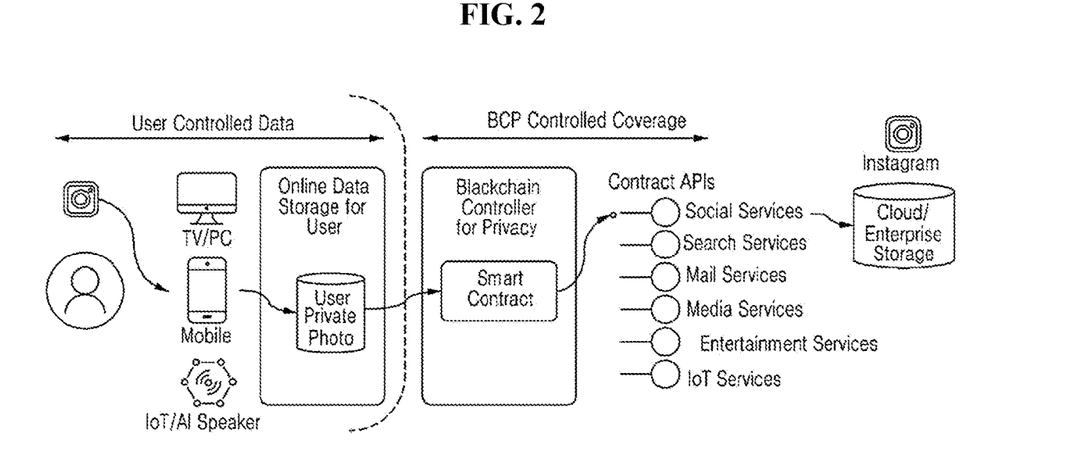
FIG. 2 is a diagram illustrating an example of a user data usage environment according to an exemplary embodiment of the present invention.

FIG. 2 is a diagram illustrating an example of a user data usage environment according to an exemplary embodiment of the present invention.

Referring to FIG. 2, according to the present invention, when a service provider of a social service, a search service, a mail service, a media service, etc. wants to use user data corresponding to personal data, the service provider may examine usage record and usage information of the user data by accessing the user data under a smart contract with a BCP having a right to access user data.

Figure 3:
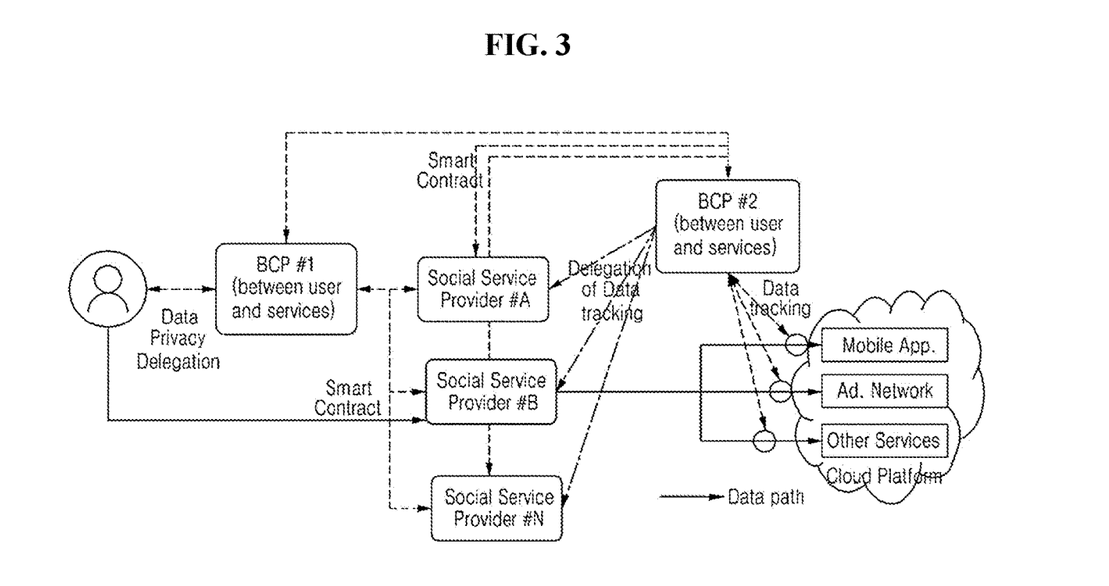
FIG. 3 is a diagram illustrating an example of recording and management of user data used by a service provider according to an exemplary embodiment of the present invention.

FIG. 3 is a diagram illustrating an example of recording and management of user data used by a service provider according to an exemplary embodiment of the present invention.

For example, as shown in FIG. 3, data of an actual user is moved to a cloud platform through social service provider #B. Other social service providers #A and #C may collect user data through BCP #2.

In this case, according to the present invention, the history of services using personally identifiable information (PII) through BCPs #1 and #2 authenticated by the user may be examined, and service providers are also required to use a function in the form of a BCP.

Figure 4:
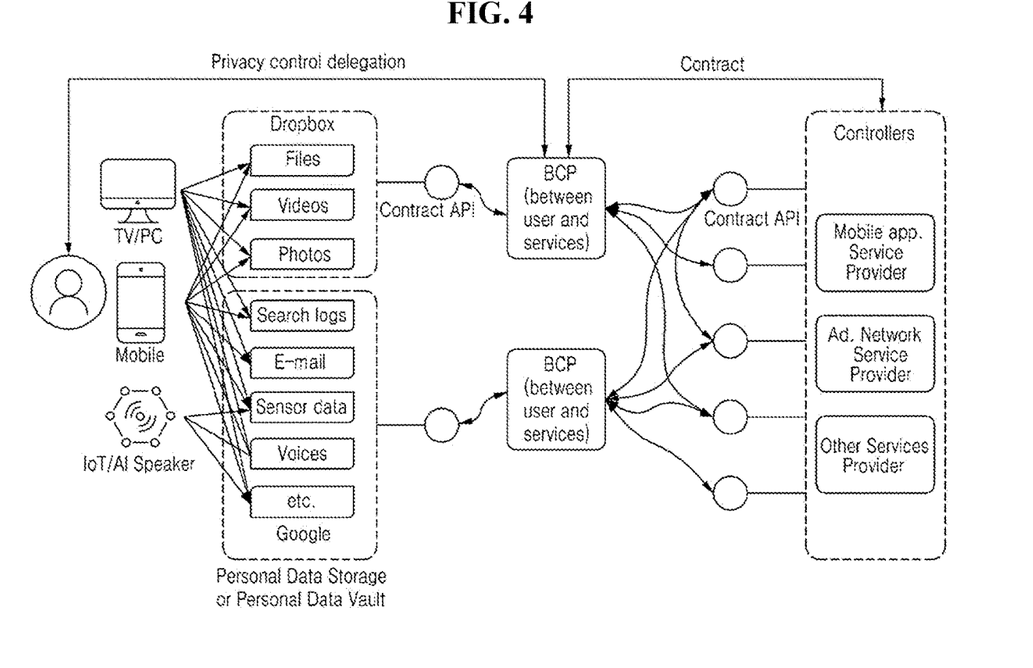
FIG. 4 is a diagram illustrating an example of an actual service configuration employing a blockchain controller for privacy (BCP) according to an exemplary embodiment of the present invention.

FIG. 4 is a diagram illustrating an example of an actual service configuration according to an exemplary embodiment of the present invention. A user may delegate a right to access his or her data to a BCP, and a service provider may use user data under a contract with the BCP to which the right is delegated.

Functional characteristics of a BCP according to the present invention are as follows.

1. The BCP makes a data privacy-related contract with a user.
2. The BCP provides its own personal data storage or vault.
3. The BCP makes a contract with an online data storage used by the user.
4. The BCP provides an interface function of interoperating with the online data storage used by the user.
5. The BCP provides a BCP agent for monitoring a service usage environment of the user (an environment in which personal information-related data is generated).

First, a data privacy-related contract process between the BCP and the user is performed as follows.

The BCP provides a contract for data privacy as a method for clearly monitoring exposure of user data at various points of contact at which the user data is exposed online.

As for major exposable online data of the user, according to a contract with the user, (1) only a portion providable at major exposure points in the form of a software development kit (SDK) or application program interface (API) may be exposed, or (2) personal information may be distinguished through overall monitoring at a network monitoring level.

Here, a web-based or application-based server corresponds to (1), and corresponding service providers are required to provide information on a right to monitor data as well.

Figure 5:
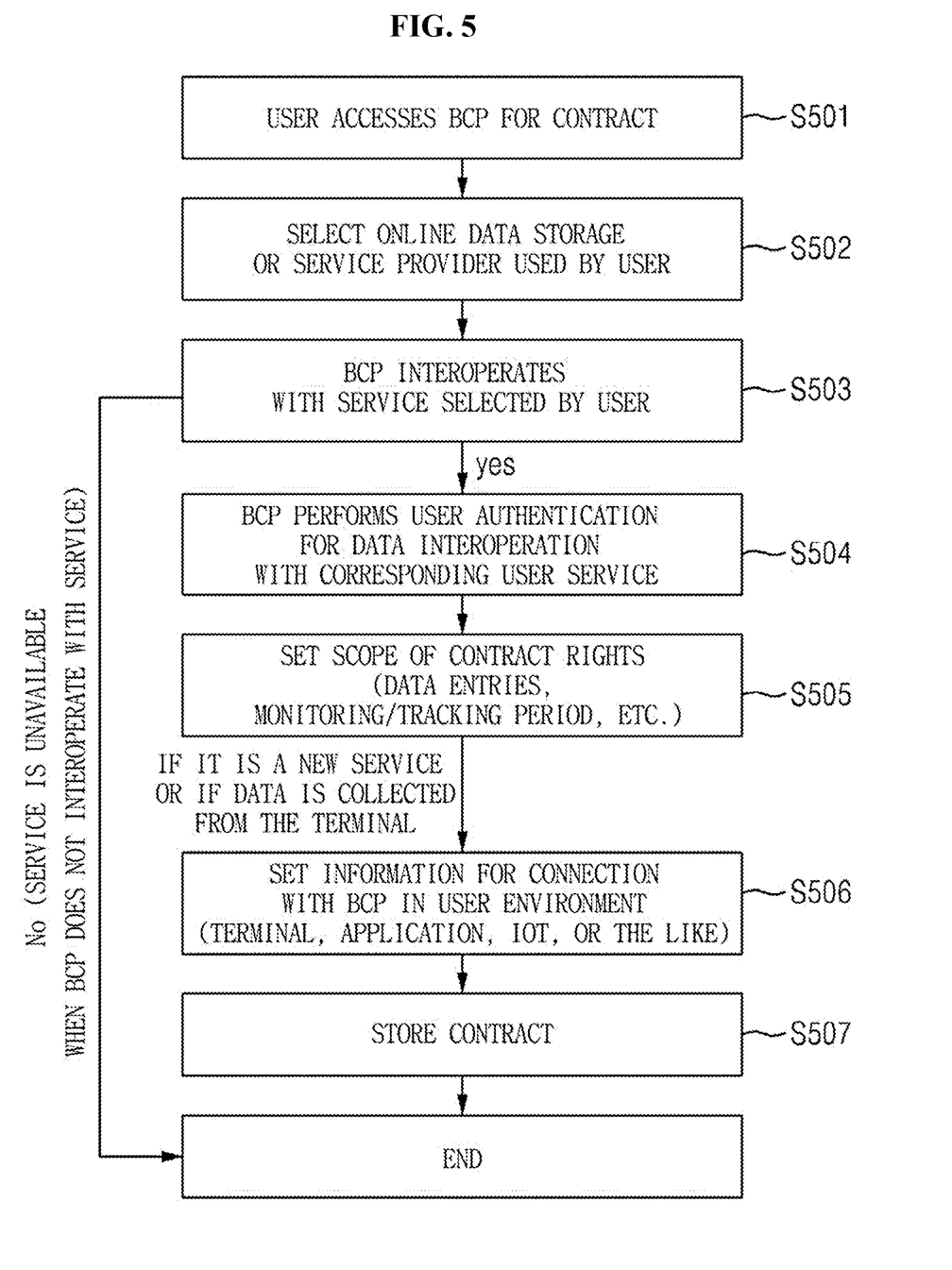
FIG. 5 is a flowchart illustrating a data privacy-related contract process between a BCP and a user according to an exemplary embodiment of the present invention.

FIG. 5 is a flowchart illustrating a data privacy-related contract process between a BCP and a user.

Referring to FIG. 5, the user may access the BCP, to which the user wants to delegate the right to access his or her data, for the purpose of contract formation (S501), and the BCP may receive a contract request of the user accessing the BCP (S501).

The BCP may receive the selection of a service (an online data storage or a service provider) used by the user (S502).

The BCP determines whether the BCP interoperates with the service selected by the user (S503). When the BCP does not interoperate with the service used by the user, a blockchain-based personal information providing service is not provided.

When the BCP interoperates with the service used by the user, the BCP may perform user authentication for data interoperation with the service (S504). For example, the BCP may request access to the service used by the user like an open authorization (OAuth) method.

When user authentication is completed, the BCP may set the scope of contract rights (S505). The scope of contract rights refers to the scope of access rights and may include, for example, data entries and monitoring and tracking periods. The service provider may provide information on the scope of data provision, the time point of consent, etc. agreed upon by the user at the time of subscription. Here, the BCP may set data accessibility such as API-based access and direct file access (DFA). Also, the BCP may set data coverage including whether to allow data access according to classes such as potential PII (PPII) and PII. In addition, the BCP may set data anonymization according to the user's request.

When the service used by the user is a new service or a user terminal collects data, information for the connection with the BCP may be set in a user environment (the terminal, application, Internet of things (IoT), etc.), and the BCP may receive the information for the connection with the user environment (S506). To this end, the BCP may provide an API gateway address to which data of the user will be uploaded.

In the case of an online service provider, such as a case in which user data is already present online, the setting operation with the terminal (S506) may be omitted.

The BCP may store information, which is set for the service used by the user through the above-described operations 5501 to 5506, as contract information with the user (S507).

Figure 6:
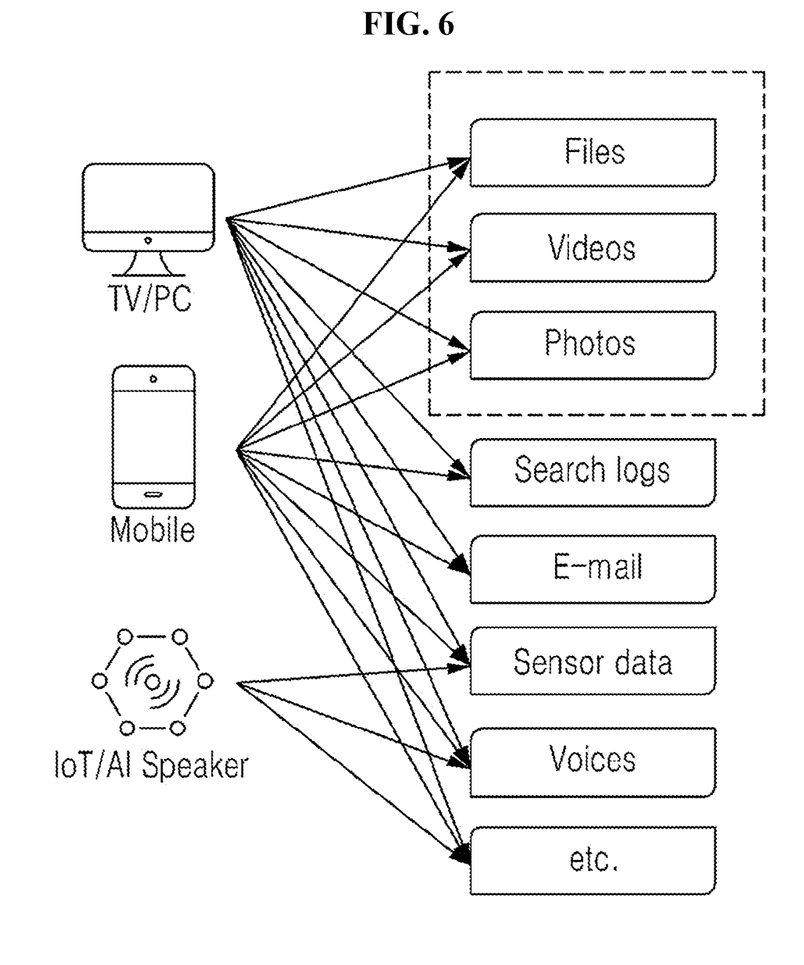
FIG. 6 is an example diagram illustrating various user environments in which a web service is available.

As shown in FIG. 6, a user may subscribe to a specific web service that he or she wants to use on a browser through various user environments.

Figure 7:
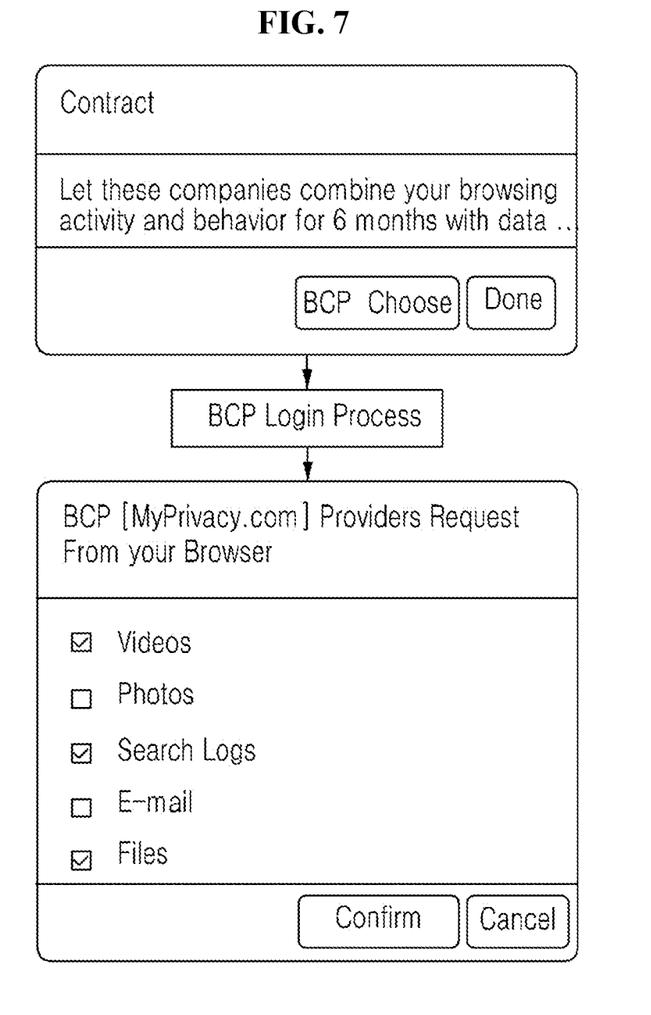
FIG. 7 is an example diagram illustrating a process of setting a monitoring target through a BCP according to an exemplary embodiment of the present invention.

For example, referring to FIG. 7, the web service may confirm an intention to use a BCP in a user subscription process. When the user inputs his or her intention to use a BCP, a BCP login process may be provided, and the user may log in to the BCP used by himself or herself through the BCP login process.

The BCP may provide a list of data which may be monitored regarding the user's personal information requested by the web service that the user wants to subscribe to and then set a data entry selected by the user through the list as a monitoring target.

Next, a process of providing a BCP's own personal data storage is as follows.

The BCP may provide the function of a personal data storage or vault.

Figure 8:
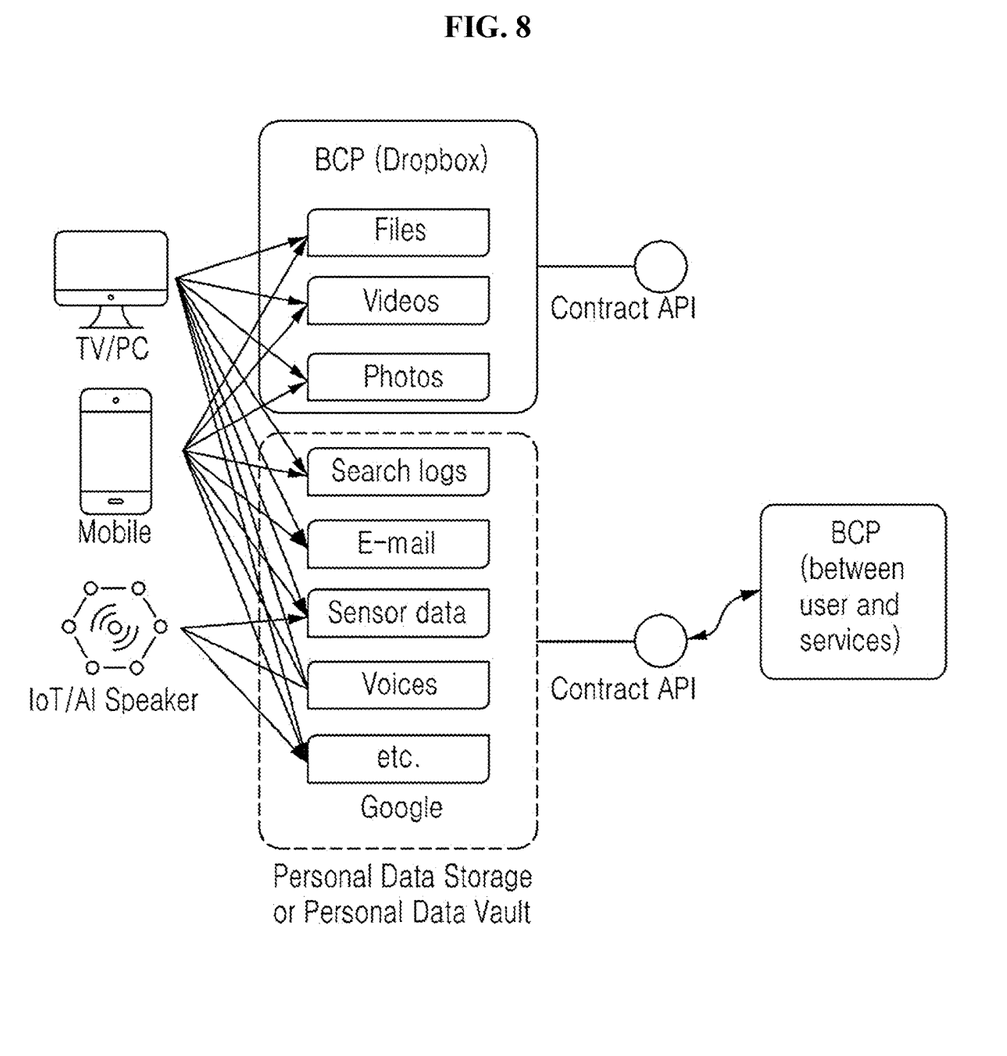
FIG. 8 is an example diagram illustrating a process of providing a BCP's own personal data storage according to an exemplary embodiment of the present invention.

Referring to FIG. 8, for example, Dropbox allows existing personal cloud data storage providers or productive tool providers to extend in a BCP form by adding a function of monitoring blockchain-based data input and output, controlling a right of user data input and output for smart contract-based external third party services, and monitoring whether to provide the right to a data management environment. In the case of Google, Google may contract with a separate BCP, and only the BCP may manage points of contact exposed to third parties so that Google may exclusively provide its own BCP function in conjunction with the BCP.

Next, a data transmission process employing a BCP agent is as follows.

Figure 9:
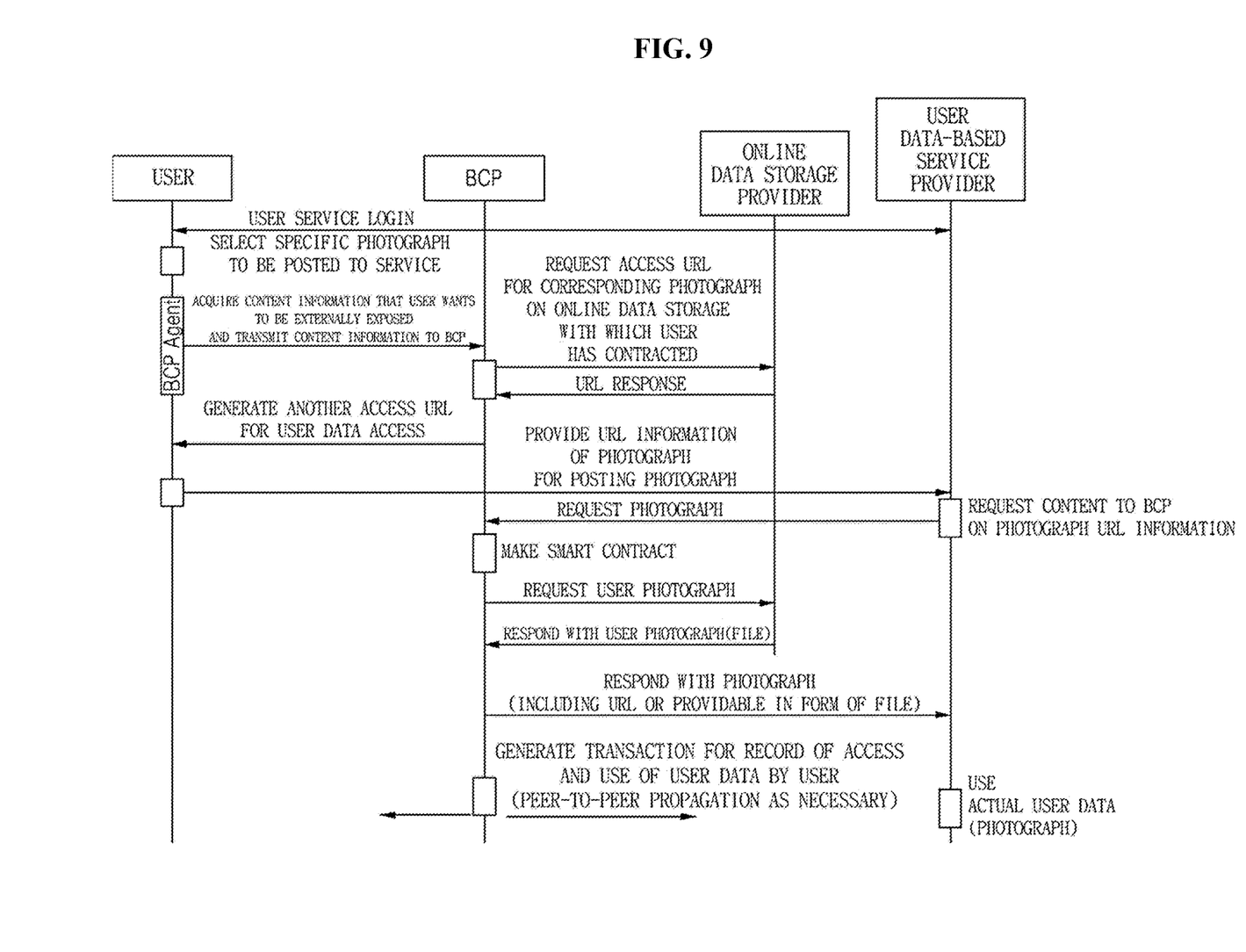
FIG. 9 is an example of a sequence diagram illustrating a data transmission process employing a BCP agent according to an exemplary embodiment of the present invention.

FIG. 9 is a sequence diagram illustrating a data transmission process employing a BCP agent.

It is assumed that an actual photograph is uploaded online, and a BCP is aware of information on the corresponding data under a contract with an online data storage of a user.

Referring to FIG. 9, when the user selects a photograph to post on a web service to which the user has logged in, a BCP agent acquires content information that the user wants to be externally exposed and then transmits the content information to the BCP.

The BCP may acquire an access uniform resource locator (URL) for the corresponding photograph information on the online data storage with which the user has contracted and then generate and transmit a separate URL for user data access.

When the user provides the URL information of the selected photograph for posting the photograph to the web service, the web service may search for BCP information in the URL information of the photograph and request the photograph from the BCP.

In response to the request from the web service, the BCP may make a smart contract with the web service and then transmit the photograph (the URL or the photograph in the form of a file) that the user wants to post to the web service. Then, the web service may use the actual user data, that is, the photograph.

After the user data is transmitted to the web service, the BCP may generate a transaction for a record of use of the user data by a provider of the web service.

The BCP may provide the BCP agent for monitoring a user service usage environment (personal information-related data generation environment).

Here, the BCP agent provides a function for interoperation between the BCP and user data generated by a general terminal or in a user device environment.

The BCP agent may be installed in each of the following environments.

1) Mobile OS Framework Level

A function for monitoring PII-related information, for example, permission, user generated data, and a system log, may be provided at the OS level.

2) Browser Extensions

A function for monitoring use or application of PII by web services, which do not provide a web service framework, may be provided using an extension of a browser installed on a user terminal.

3) Web Service Framework

A function for representing PII-related information in the form of, for example, "Privacy.jr" in a web service and monitoring the PII-related information may be provided.

4) PII-Related Service (Application or Application Client)

In an environment, such as a general social service, in which user data is provided to a third party (controller), 1) when all the data of a user is present in an online personal data storage, the online data may be transmitted through BCP-based relay, and 2) when it is necessary to upload user data at the time point of request, the data may be uploaded and then transmitted through the same process as described in 1).

According to the exemplary embodiments of the present invention, it is possible to provide an optimal balance point between the activation of data ecology, such as the data-driven fourth industry, and demands for the protection of individual privacy.

The above-described device may be implemented as a hardware component, a software component, and/or a combination of a hardware component and a software component. For example, the device and components described in the exemplary embodiments may be implemented using one or more general-purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. The device may execute an OS and one or more software applications executed on the OS. In addition, the device may access, store, manipulate, process, and generate data in response to the execution of the software. For convenience of understanding, when a single device is described as being used in some cases, those of ordinary skill in the art recognize that the device may include a plurality of processing elements and/or a plurality of types of processing elements. For example, the device may include a plurality of processors or a single processor and a single controller. In addition, other processing configurations, such as a parallel processor, are also possible.

Software may include a computer program, code, an instruction, or one or more combinations thereof and may form the device to be operated as desired or may independently or collectively command the device. The software and/or data may be permanently or temporarily embodied in any type of machine, component, physical device, or computer storage medium or device in order to be interpreted by the device or provide an instruction or data to the device. The software may be distributed over a networked computer system to be stored or executed in a distributed manner. The software and data may be stored on one or more computer-readable recording media.

A method according to an exemplary embodiment may be implemented in a program instruction form, which may be executed through various computing devices, and recorded on a computer-readable medium. Here, the medium may continuously store the computer-executable program or temporarily store the computer-executable program for execution or downloading. Also, the medium may be a variety of recording devices or storage devices in the form of a single piece of hardware or a combination of a plurality of pieces of hardware. The medium is not limited to a medium directly connected to any computer system and may be dispersed on a network. Examples of the medium include a magnetic medium, such as a hard disk, a floppy disk, and magnetic tape, an optical recording medium, such as a CD-ROM and a DVD, a magneto-optical medium, such as a floptical disk, and media which are specially configured to store program instructions such as a ROM, a RAM, and a flash memory. As another example of the medium, there is a recording medium or a storage medium managed by an application store which distributes applications, or a website, a server, or the like which supplies or distributes various other software.

Although the present invention has been described above in connection with the limited embodiments and drawings, those of ordinary skill in the art may make various modifications and alterations from the description. For example, proper results may be achieved even when the descriptions are performed in an order different from that of the above-described method, and the components of the above-described system, structure, device, circuit, etc. are coupled or combined in a form different from that described above or replaced or substituted with other elements or equivalents.

Accordingly, other implementations, other embodiments, and the equivalents of the claims fall within the scope of the following claims.

What is claimed is:

1. A method of providing personal information by using a blockchain controller for privacy (BCP) agent, executed in a computer device including at least one processor configured to execute computer-readable instructions included in a memory, the method comprising:
   making, by the at least one processor, a data privacy-related contract with a user, by performing:
      displaying a user interface to receive, from the user, a confirmation on an intention to use a blockchain controller for privacy (BCP), in a user subscription process;
      providing a BCP login process, in response to the confirmation on the intention to use the BCP;
      displaying a list of user data, which include user's personal information that is capable of being monitored and is requested by a web service that the user requested to subscribe; and
      setting a monitoring target including a data entry selected by the user through the list; and
   providing, by the at least one processor, through the BCP agent, the user data, according to the data privacy-related contract, to the web service, and monitoring, through the BCP agent, usages of the user data by the web service,
   wherein the providing of the user data comprises:
   receiving, from the user, a selection of a photograph included in the user data as a content to be posted to the web service;
   acquiring, by the BCP agent, an access uniform resource locator (URL) of the photograph stored in an online data storage;
   generating, by the BCP agent, a separate URL, which is different from the URL of the photograph stored in the online data storage and is linked to the BCP agent;
   transmitting, by the BCP agent, the separate URL to the web service via a user terminal;
   receiving, by the BCP agent, via the separate URL, from the web service, a request for the photograph; and
   transmitting the photograph stored in the online data storage to the web service under the contract with the web service, and monitoring usages of the photograph by the web service.

2. The method of claim 1, wherein the making of the data privacy-related contract with the user further comprises:
   performing user authentication for data interoperation with an online data storage which is used by the user to store the user data; and
   setting an access right range for the online data storage when the user authentication is completed.

3. The method of claim 2, wherein the setting of the access right range comprises setting an accessible data entry and a monitoring period.

4. The method of claim 2, wherein the making of the data privacy-related contract with the user further comprises receiving information on a data providing range that the user has agreed on upon subscription from a web service provider of the online data storage.

5. The method of claim 1, wherein the making of the data privacy-related contract with the user comprises contracting with an online data storage, which is used by the user to store the user data, and providing an interface function of interoperating with the online data storage.

6. The method of claim 1, wherein the providing of the user data comprises providing a function of interoperating with the user data generated by a terminal of the user through the BCP agent for monitoring a web service usage environment of the user.

7. The method of claim 1, wherein the providing of the user data comprises:
   when the user selects one piece of the user data as a content to be posted to the web service, acquiring access information of the content from an online data storage in which the user data is stored, and transmitting the access information to the web service; and
   transmitting the content stored in the online data storage to the web service under the contract with the web service in response to a request from the web service using the access information.

8. The method of claim 7, wherein the monitoring comprises generating a transaction for a record of use of the user data by the web service after the content is transmitted to the web service.

9. A computer device including at least one processor configured to execute computer-readable instructions included in a memory, wherein the at least one processor comprises a controller configured to
   make a data privacy-related contract with a user, by performing:
      displaying a user interface to receive, from the user, a confirmation on an intention to use a blockchain controller for privacy (BCP) in a user subscription process;
      providing a BCP login process, in response to the confirmation on the intention to use the BCP;
      displaying a list of user data, which include user's personal information that is capable of being monitored and is requested by a web service that the user requested to subscribe; and
      setting a monitoring target including a data entry selected by the user through the list; and
   provide and monitor, through a BCP agent, the user data, according to the data privacy-related contract, to the web service, and monitoring, through the BCP agent, usages of the user data by the web service,
   wherein the controller is further configured to perform:
   receiving, from the user, a selection of a photograph included in the user data as a content to be posted to the web service;
   acquiring, by the BCP agent, an access uniform resource locator (URL) of the photograph stored in an online data storage;
   generating, by the BCP agent, a separate URL, which is different from the URL of the photograph stored in the online data storage and is linked to the BCP agent;
   transmitting, by the BCP agent, the separate URL to the web service via a user terminal;
   receiving, by the BCP agent, via the separate URL, from the web service, a request for the photograph; and
   transmitting the photograph stored in the online data storage to the web service under the contract with the web service, and monitoring usages of the photograph by the web service.

10. The computer device of claim 9, wherein the controller is further configured to perform user authentication for data interoperation with an online data storage, which is used by the user to store the user data, and sets an access right range for the online data storage when the user authentication is completed.

11. The computer device of claim 9, wherein the controller is further configured to contract with an online data storage, which is used by the user to store the user data, and provides an interface function of interoperating with the online data storage.

12. The computer device of claim 9, wherein the controller is further configured to provide a function of interoperating with the user data generated by a terminal of the user through the BCP agent for monitoring a web service usage environment of the user.

13. The computer device of claim 9, wherein the controller is further configured to acquire, when the user selects one piece of the user data as content to be posted to the web service, access information of the content from an online data storage in which the user data is stored and transmits the access information to the web service, and     the controller is further configured to transmit the content stored in the online data storage to the web service under the contract with the web service in response to a request from the web service using the access information.

\* \* \* \* \*